United States Patent
Schwalbe et al.

(10) Patent No.: US 10,814,914 B2
(45) Date of Patent: Oct. 27, 2020

(54) INTEGRAL AND WELDED ACCESSORY MOUNTING POINTS ON FRAME

(71) Applicant: CNH Industrial America LLC, New Holland, PA (US)

(72) Inventors: Blaine A. Schwalbe, Valders, WI (US); Brian J. Pilney, West Bend, WI (US); Steven N. Winkel, Kiel, WI (US)

(73) Assignee: CNH Industrial America LLC, New Holland, PA (US)

( * ) Notice: Subject to any disclaimer, the term of this patent is extended or adjusted under 35 U.S.C. 154(b) by 358 days.

(21) Appl. No.: 15/805,517

(22) Filed: Nov. 7, 2017

(65) Prior Publication Data

US 2019/0135345 A1    May 9, 2019

(51) Int. Cl.
| | | |
|---|---|---|
| *B62D 21/03* | (2006.01) | |
| *B62D 25/08* | (2006.01) | |
| *B62D 27/02* | (2006.01) | |
| *B62D 21/18* | (2006.01) | |

(52) U.S. Cl.
CPC ............. *B62D 21/03* (2013.01); *B62D 21/18* (2013.01); *B62D 25/085* (2013.01); *B62D 27/02* (2013.01)

(58) Field of Classification Search
CPC ................ B60G 7/02; B60G 2204/143; B60G 2204/15; B60G 2204/16; B60G 2204/41; B60G 99/004; B60G 11/183; B60G 2200/10; B60G 2200/1442; B60G 2204/4302; B60G 2204/4404; B60G 2206/014; B60G 2206/016; B60G 2206/16; B60G 2206/162; B60G 2206/60; B60G 2206/605; B60G 3/20; B60G 3/225; B60G 99/00; B62D 25/082; B62D 21/11; B62D 25/088; B62D 25/10; B62D 25/12; B62D 55/06; B62D 17/00; B62D 21/00; B62D 21/15; B62D 21/155; B62D 21/157; B62D 24/02; B62D 25/08; B62D 25/084; B62D 25/085; B62D 25/14; B62D 27/04; B62D 29/008
USPC .............. 180/69.2, 291, 292, 311, 312, 377; 280/86.752, 124.108, 124.109, 124.116, 280/124.145, 781, 784, 785, 788; 296/35.1, 35.2, 70, 187.09, 187.12, 192, 296/193.11, 198, 203.02, 204
See application file for complete search history.

(56) References Cited

U.S. PATENT DOCUMENTS

| | | |
|---|---|---|
| 2,608,327 A | 8/1952 | Bartling |
| 2,940,209 A | 4/1960 | Funk |
| 3,395,503 A | 8/1968 | Greenburg et al. |
| 3,964,565 A | 6/1976 | Cagle et al. |

(Continued)

FOREIGN PATENT DOCUMENTS

EP      1287899      11/2005

*Primary Examiner* — Ruth Ilan
*Assistant Examiner* — Hilary L Johns
(74) *Attorney, Agent, or Firm* — Rebecca L. Henkel; Rickard K. DeMille (57) ABSTRACT

A chassis frame including a top plate, a bottom plate spaced apart from the top plate, a plurality of side plates extending from the top plate to the bottom plate, a plurality of mounting tabs extending from at least one of the top plate and the bottom plate and being integrally formed therewith, and a plurality of mounting brackets permanently coupled to at least one of the top plate and the plurality of side plates.

20 Claims, 7 Drawing Sheets

(56) References Cited

U.S. PATENT DOCUMENTS

| | | | | |
|---|---|---|---|---|
| 4,046,415 | A | * | 9/1977 | Klees .................. B60G 99/004 |
| | | | | 296/35.1 |
| 4,486,029 | A | * | 12/1984 | Raidel .................... B60G 5/047 |
| | | | | 267/46 |
| 5,878,940 | A | | 3/1999 | Rosenbalm |
| 5,927,736 | A | * | 7/1999 | Salfinger ................. A61G 5/00 |
| | | | | 280/104 |
| 5,975,624 | A | * | 11/1999 | Rasidescu ............ B62D 21/183 |
| | | | | 180/311 |
| 6,039,335 | A | * | 3/2000 | Sheridan .............. B62D 21/183 |
| | | | | 280/124.103 |
| 6,131,286 | A | | 10/2000 | Kelly et al. |
| 6,491,234 | B2 | | 12/2002 | Beggs |
| 6,634,541 | B1 | | 10/2003 | Hankey et al. |
| 6,966,501 | B2 | | 11/2005 | Wubben et al. |
| 7,044,677 | B2 | | 5/2006 | Moser et al. |
| 9,054,511 | B1 | | 6/2015 | Wein |
| 2005/0087971 | A1 | * | 4/2005 | Studebaker .......... B60K 15/067 |
| | | | | 280/781 |
| 2006/0125228 | A1 | * | 6/2006 | Studebaker ........... B60K 15/067 |
| | | | | 280/834 |

\* cited by examiner

INTEGRAL AND WELDED ACCESSORY MOUNTING POINTS ON FRAME

FIELD OF THE INVENTION

The invention relates generally to agricultural product application equipment such as self-propelled sprayers and, in particular, to a chassis frame having mounting tabs integral with the chassis frame and mounting brackets welded directly to the chassis frame.

BACKGROUND OF THE INVENTION

High-clearance sprayers are getting larger and more complex, with numerous on-board systems and accessories that have to be supported by their frames. Brackets are typically bolted to the frames for supporting these systems and accessories. These bolted connections can loosen over time, especially for accessory-supporting brackets that are cantilevered from the frame. Further, mounting the accessory-supporting brackets to the frame takes time during assembly and the bolted connections can loosen over time which may allow vibrations or undesired relative movement between the bracket and the frame.

Therefore, it is desired to have brackets that are welded to the frame and mounting tabs that are provided as integral projections of certain walls of the chassis frame.

SUMMARY OF THE INVENTION

The present invention is directed to a number of accessory mounting points that are integral with the chassis frame and/or welded to the chassis frame.

According to one aspect of the invention, a chassis frame including a top plate, a bottom plate spaced apart from the top plate, a plurality of side plates extending from the top plate to the bottom plate, a plurality of mounting tabs extending from at least one of the top plate and the bottom plate and being integrally formed therewith, and a plurality of mounting brackets permanently coupled to at least one of the top plate and the plurality of side plates.

In accordance with another aspect of the invention, each of the plurality of mounting tabs includes at least one orifice formed therethrough. The plurality of mounting tabs may extend from at least one edge of the top plate. Alternatively, the plurality of mounting tabs may extend from at least one edge of the bottom plate.

In accordance with yet another aspect of the invention, the plurality of mounting brackets is permanently coupled to at least one of a side surface and a top surface of the top plate. In one embodiment, at least one of the plurality of mounting brackets is permanently coupled to at least one of the plurality of side plates and is cantilevered from its respective side plate.

In accordance with another aspect of the invention, the chassis frame further includes a plurality of central openings. Each central opening has a perimeter formed from edges of the top and bottom plates of the chassis frame. Each of the plurality of mounting tabs extends from the perimeter of the central opening.

According to another aspect of the invention, a method of manufacturing a chassis frame includes providing a top plate, providing a bottom plate spaced apart from the top plate, coupling a plurality of side plates to the top plate to the bottom plate, each side plate extending between the top plate and the bottom plate, forming a plurality of mounting tabs along at least one edge of at least one of the top plate and the bottom plate so that each of the plurality of mounting tabs extends therefrom, and coupling a plurality of mounting brackets to at least one of the top plate and the plurality of side plates.

In accordance with another aspect of the invention, coupling a plurality of mounting brackets includes permanently coupling at least one of the plurality of mounting brackets to at least one a side surface and a top surface of the top plate.

In accordance with yet another aspect of the invention, coupling a plurality of mounting brackets may include permanently coupling at least one of the plurality of mounting brackets to at least one of the plurality of side plates. In addition, coupling at least one of the plurality of brackets to at least one of the plurality of sides plates may include cantilevering the mounting bracket from its respective side plate.

In accordance with another aspect of the invention, forming a plurality of mounting tabs includes forming at least one orifice extending through each of the plurality of the plurality of mounting tabs.

According to yet another aspect of the invention, a chassis frame includes a main support section and an engine support section. The main support section and the engine support section both include a top plate, a bottom plate spaced apart from the top plate, a plurality of side plates extending from the top plate to the bottom plate, a plurality of mounting tabs extends from at least one of the top plate and the bottom plate and being integrally formed therewith, and a plurality of mounting brackets is permanently coupled to at least one of the top plate and the plurality of side plates.

In accordance with another aspect of the invention, the main support section and the engine support section are defined by a plurality of side rails and a plurality of cross-members intersecting at a plurality of intersection points and at least one central opening is disposed between the intersecting side rails and cross-members. Each central opening has a perimeter defined by the adjacent intersecting side rails and cross-members. At least one of the plurality of mounting tabs within the main support section of the chassis frame extends from at least one cross-member along the perimeter of at least one central opening. At least one of the plurality of mounting tabs within the engine support section of the chassis frame extends from at least one side rail along the perimeter of at least one central opening.

In accordance with yet another aspect of the invention, the main support section and the engine support section are defined by a plurality of side rails and a plurality of cross-members intersecting at a plurality of intersection points. At least one of the plurality of mounting tabs within the main support section of the chassis frame extends from at least one side rail along an outer edge of the chassis frame.

In accordance with another aspect of the invention, at least one of the plurality of mounting brackets may be permanently coupled a top surface the top plate. Alternatively, at least one of the plurality of mounting brackets may be permanently coupled to at least one of the plurality of side plates and cantilevered from its respective side plate.

In accordance with yet another aspect of the invention, the main support section and the engine support section are defined by a plurality of side rails and a plurality of cross-members intersecting at a plurality of intersection points. The plurality of mounting brackets within the main support section are coupled to at least one of a top plate of one of the side rails, a top plate of one of the cross-members, and a side plate of one of the cross-members.

In accordance with another embodiment of the invention, the main support section and the engine support section are defined by a plurality of side rails and a plurality of cross-members intersecting at a plurality of intersection points. The plurality of mounting brackets within the engine support section are coupled to a top plate of plurality of side rails, a side plate of the plurality of side rails, and a side plate of one of the cross-members.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
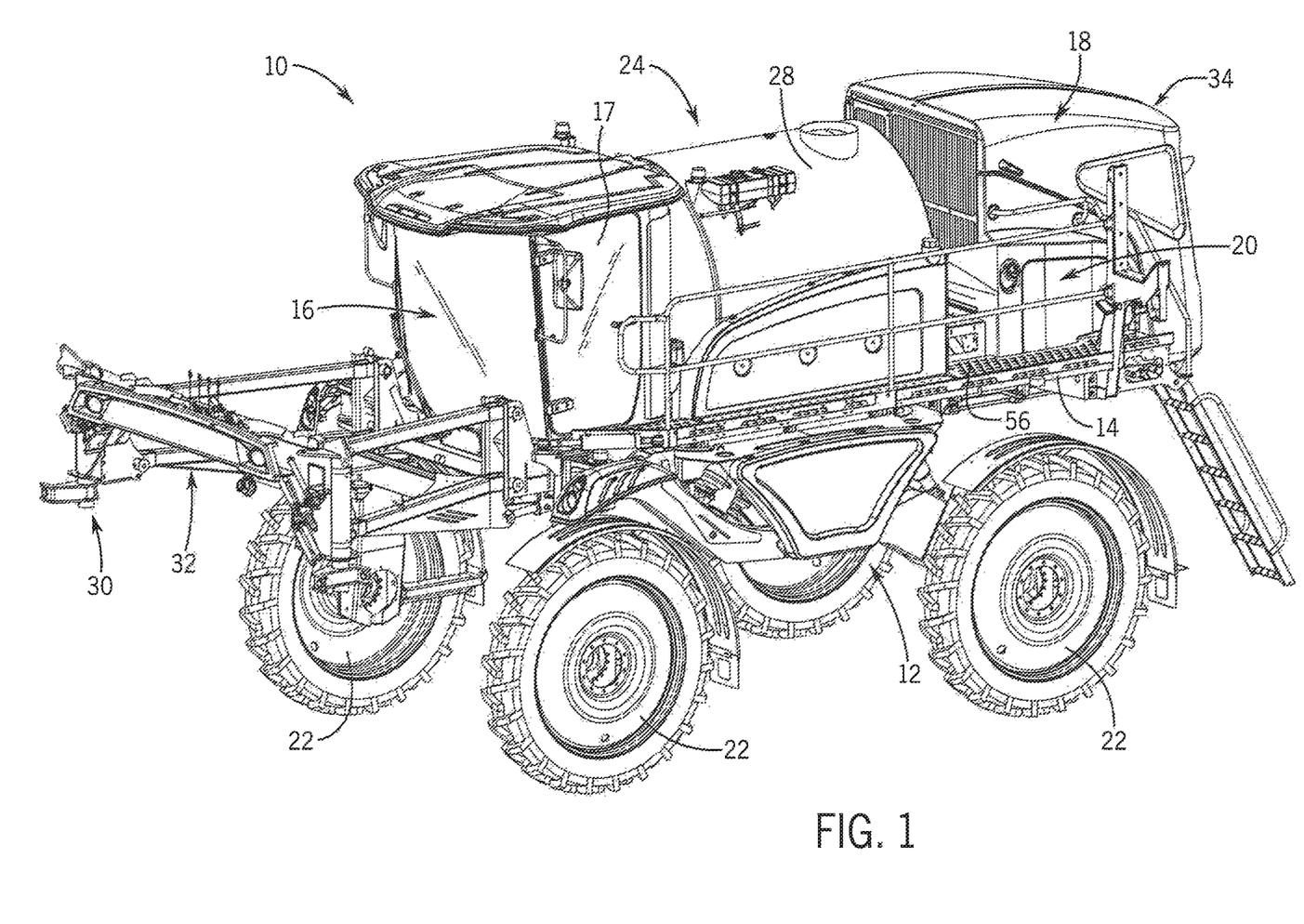
FIG. 1 is an isometric view of an agricultural machine.

Referring now to the drawings and specifically to FIG. 1, aspects of the invention are shown for use with an agricultural machine, for example, but not limited to, an agricultural sprayer. The agricultural sprayer is shown here as a self-propelled agricultural sprayer vehicle or self-propelled sprayer 10. Although the sprayer 10 is shown as a front-mounted boom self-propelled sprayer, it is understood that self-propelled versions of the sprayer 10 can have either front-mounted or rear-mounted booms, such as those available from CNH Industrial, including the Miller Nitro and Condor Series sprayers, and New Holland Guardian Series sprayers.

Still referring to FIG. 1, the sprayer 10 includes a chassis 12 having a chassis frame 14 that supports various assemblies, systems, and components. These various assemblies, systems, and components can include an operator cab 16, an engine 18, an engine accessory system 34, and a hydraulic system 20. The hydraulic system 20 receives power from the engine 18 and includes at least one hydraulic pump which can be in a hydrostat arrangement for providing hydraulic pressure for operating hydraulic components within the hydraulic system 20. For sprayers with hydrostatic drives, hydraulic motors are operably connected to the hydraulic pump(s) for rotating the wheels 22. In mechanical drive applications, a mechanical transmission receives power from the engine 18 and delivers power for rotating the wheels 22 by way of power-transmitting driveline components such as drive shafts, differentials, and other gear sets in portal, drop boxes, or other housings. A spray system 24 can include storage containers such as a rinse tank 26 for storing water or a rinsing solution and a product tank 28 for storing a volume of product for delivery onto an agricultural field with the sprayer 10. A product delivery pump can convey product from the product tank 28 through plumbing components such as interconnected pieces of tubing and through a boom tubing system for release out of spray nozzles that are spaced from each other along the width of boom 30 during spraying operations of the sprayer 10. Groups or banks of multiple adjacent spray nozzles define multiple spray sections of the spray system. Spray sections are defined along the boom 30 and selectively deliver product for release onto an agricultural field at locations corresponding to positions of activated spray sections. The boom 30 is connected to the chassis 12 with the lift arm assembly 32 that is configured to move the boom 30 up and down for adjusting the height of application of the product.

Figure 2:
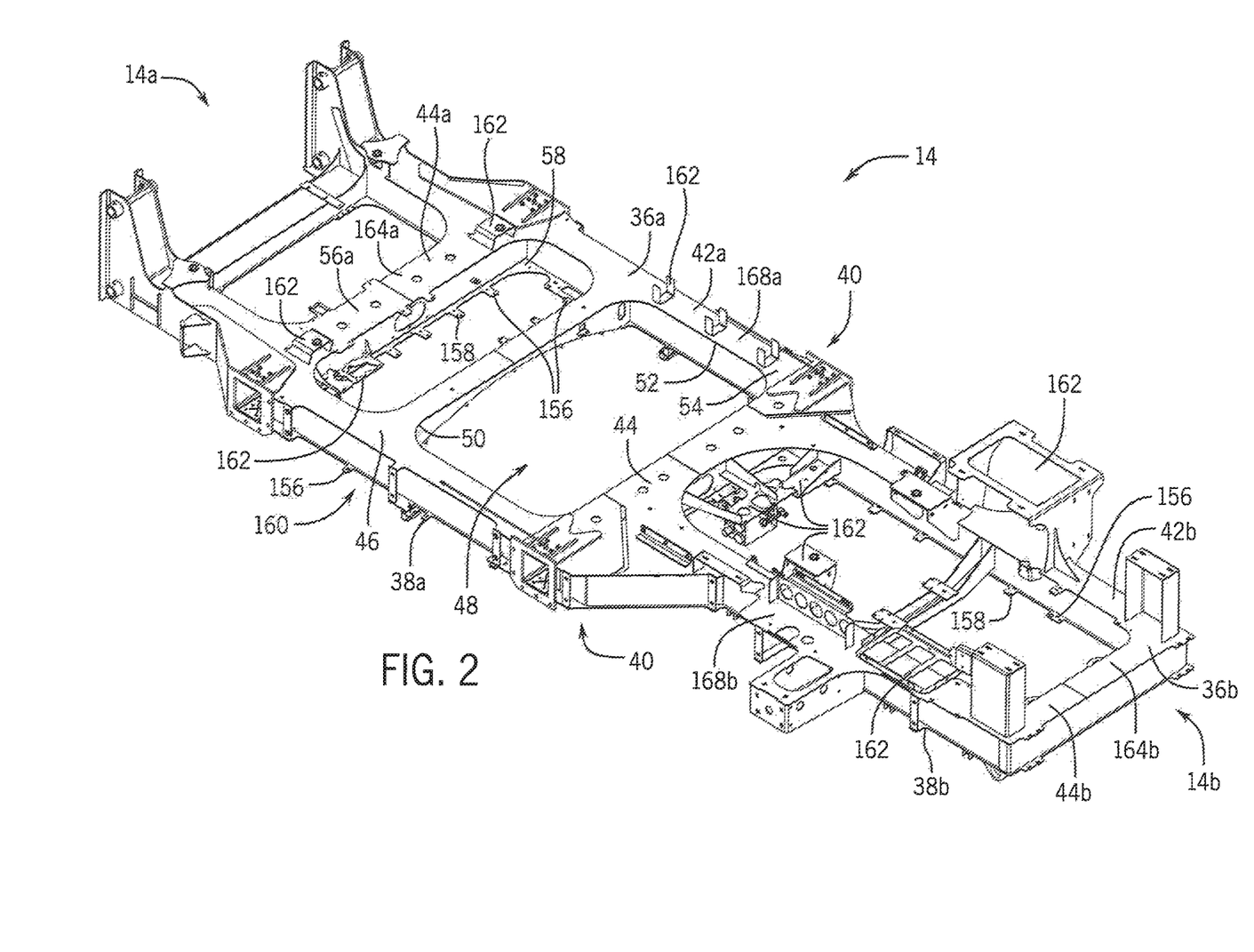
FIG. 2 is a perspective view of a chassis frame of the agricultural machine.
Figure 3:
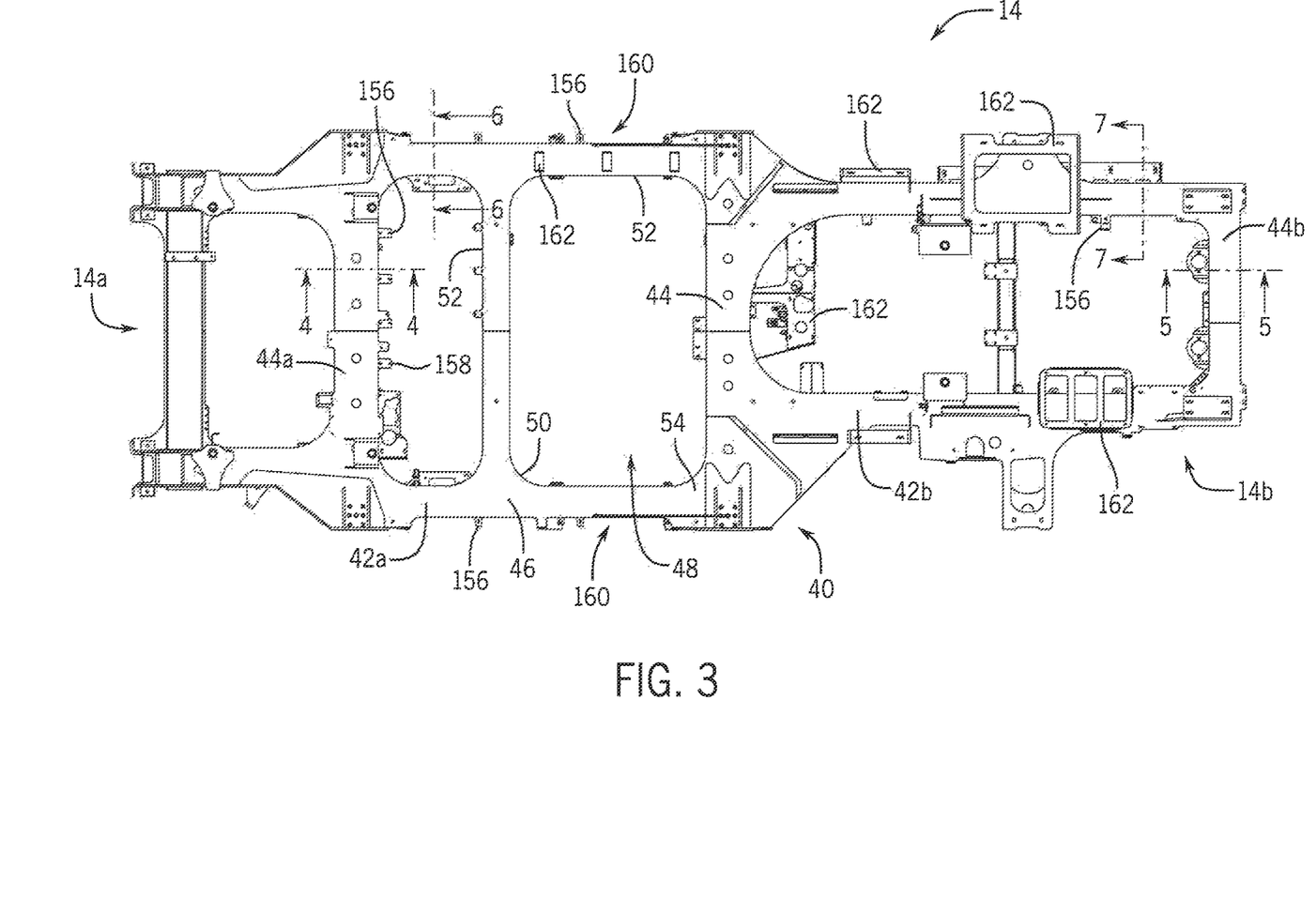
FIG. 3 is a top view of the chassis frame of FIG. 2.

FIGS. 2 and 3 depict perspective and top views, respectively, of the chassis frame 14 of the sprayer 10 without the operator cab 16, engine 18, hydraulic system 20, spray system 24, rinse tank 26, product tank 28, boom 30, lift arm assembly 32, and engine accessory system 34 removed, in order to further illustrate the chassis frame 14. As will be described in further detail below, the chassis frame 14 is a boxed plate constructed frame having top and bottom walls 36, 38, respectively. The top and bottom walls 36, 38 of the chassis frame 14 may be one of a number of thicknesses depending the strength needs of a specific section of the chassis frame 14.

The chassis frame 14 includes a front portion 14a, which is situated under and supports the weight of the operator cab 16, lift arm assembly 32, boom 30, rinse tank 26, product tank 28, and spray system 34 so that the front portion 14a defines a main support section of chassis frame 14. The chassis frame 14 further also includes a rear portion 14b, which is situated under and supports the weight of the engine 18 and engine accessory system 34 so that the rear portion 14b defines an engine support section of the chassis frame 14. The front and rear portions 14a, 14b of the chassis frame 14 are joined together at a plurality of transition joints 40, which will be described later in further detail.

The chassis frame 14 includes two (2) side rails 42 that run along the length of the chassis frame 14. As shown in FIGS. 2 and 3, the side rails 42 are oriented parallel to each other. While the representative embodiment of the invention illustrates the use of two (2) side rails 42, it is contemplated that other embodiments of the invention may use more or less than two (2) side rails 42.

The chassis frame 14 further includes a plurality of cross-members 44 that extend between the side rails 42 and are oriented perpendicular thereto. As show in FIGS. 2 and 3, the each cross-member 44 intersects with a side rail 42 at an intersection point 46. In varying embodiments of the invention, each cross-member 44 intersects with at least two (2) side rails 42 at respective intersection points 46. While the representative embodiment of the invention illustrates the top walls 36 of the chassis frame as being integral across adjacent side rails 42 and cross-members 44, it is also contemplated that each side rail 42 and cross-member 44 may distinct top walls 36 that re coupled together. It is contemplated that any number of cross-members 44 may be used in varying embodiments of the invention. In addition, while the representative embodiment of the invention depicts each cross-member 44 extending between respective side rails 42 and terminating at each intersection point 46, alternative embodiments of the invention may include cross-members 44 that extend beyond the intersection points 46 and the side rails 42.

The chassis frame 14 may also include a plurality of openings 48 throughout the chassis frame 14, which result in reduced weight. As shown in FIGS. 2 and 3, the intersection of side rails 42 and cross-members 44 results in openings surrounded by adjacent side rails 42 and cross-members 44 between the intersecting side rails and cross-members 44. Each intersection point 46 is associated with a corner 50 of at least one central opening 48. The perimeter 52 of each central opening 48 is defined by the edges of the adjacent side rails 42 and cross-members 44.

The top wall 36 of the chassis frame 14 may also include gusset portions 54. Each gusset portion 54 is located at a respective corner 50 of a central opening 48. As a result of the gusset portions 54, the corners or the central opening 48 are rounded in shape. In addition, the gusset portions 54 reduced force concentrations at the transition joints 40 between the side rails 42 and the cross-members 44. That is, the gusset portions 54 provide a greater surface area at each intersection joint 40 to spread the forces across a greater surface area.

The term permanently coupled, as used below and throughout the application, may refer to, but is not limited, a welded connection between elements.

Figure 4:
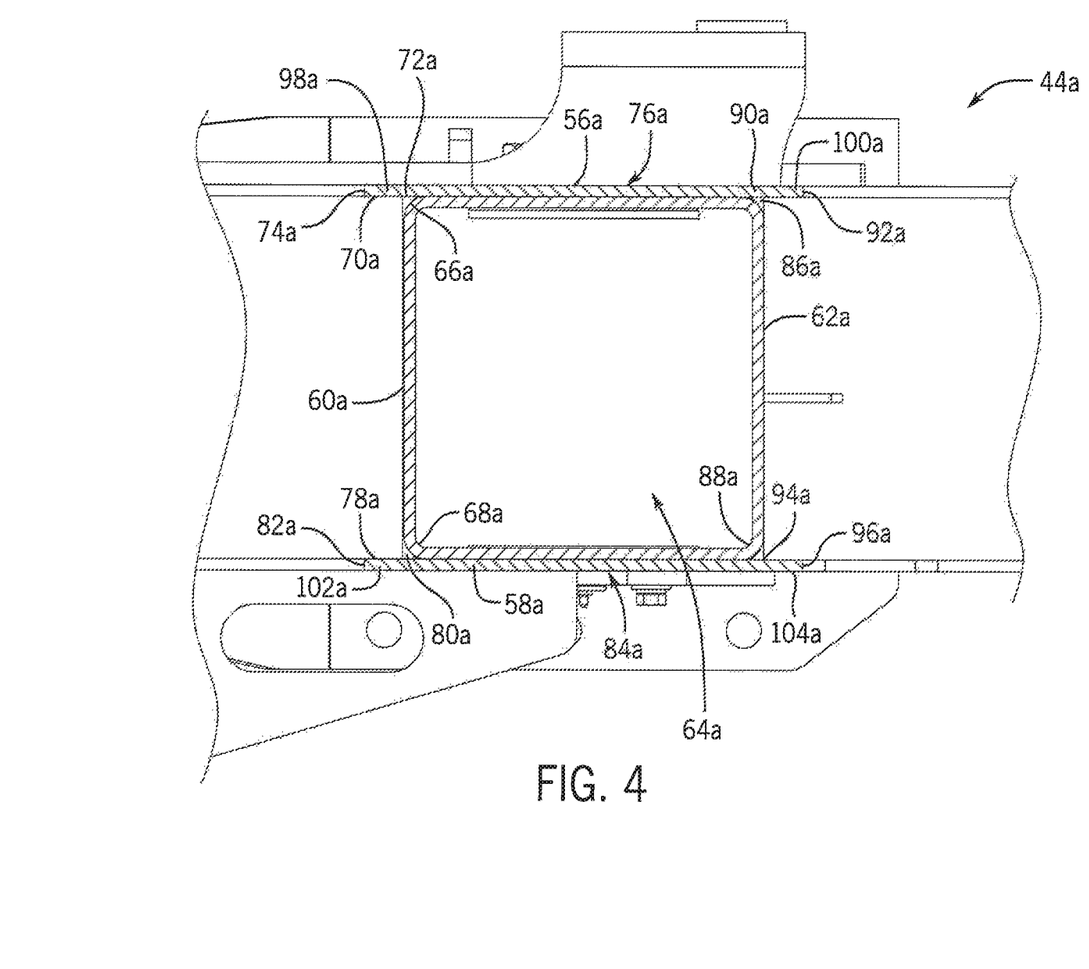
FIG. 4 is a cross-sectional view of a cross-member from a front portion of the chassis frame of FIG. 3, taken along line 4-4.

Next, FIG. 4 illustrates a cross-sectional view of a cross-member 44a from the front portion 14a of the chassis frame 14 of FIG. 3, taken along line 4-4. As shown in the cross-sectional view of FIG. 4, the cross-member 44a of the chassis frame 14 is formed by a top plate 56a, a bottom plate 58a, a front side plate 60a, and a rear side plate 62a, which surround a hollow cavity 64a. The hollow cavity 64a of the cross-member 44a assists in reducing the weight of the chassis frame 14.

The front side plate 60a includes a first end 66a and a second end 68a. The first end 66a of the front side plate 60a is permanently coupled to a bottom surface 70a of the top plate 56a at a first location 72a between a first end 74a and a center point 76a of the top plate 56a. The second end 68a of the front side plate 60a is permanently coupled to a top surface 78a of the bottom plate 58a at a first location 80a between a first end 82a and a center point 84a of the bottom plate 58a. Similarly, the rear side plate 62a includes a first end 86a and a second end 88a. The first end 86a of the rear side plate 62a is permanently coupled to the bottom surface 70a of the top plate 56a at a second location 90a between a second end 92a and the center point 76a of the top plate 56a. The second end 88a of the rear plate 62a is permanently coupled to the top surface 78a of the bottom plate 58a at a second location 94a between a second end 96a and the center point 84a of the bottom plate 58a.

In light of the construction above, the top plate 56a includes a portion 100a adjacent the first end 74a of the top plate 56a that extends beyond the front side plate 60a. The top plate 56a also includes another portion 102a adjacent the second end 92a of the top plate 56a that extends beyond the rear side plate 62a, Similarly, the bottom plate 58a includes a portion 104a, which is adjacent the first end 82a of the bottom plate 58a and extends beyond the front side plate 60a, and a portion 106a, which is adjacent the second end 96a of the bottom plate 58a and extends beyond the rear side plate 62a.

In alternative embodiments of the invention, the front and rear side plates 60a, 62a may between the ends 74a, 92a, 82a, 96a, of the top and bottom plates 56a, 58a, respectively. In such alternative embodiments of the invention, the top and bottom plates 56a, 58a would not include portions 100a, 102a, 104a, 106a, respectively.

Figure 5:
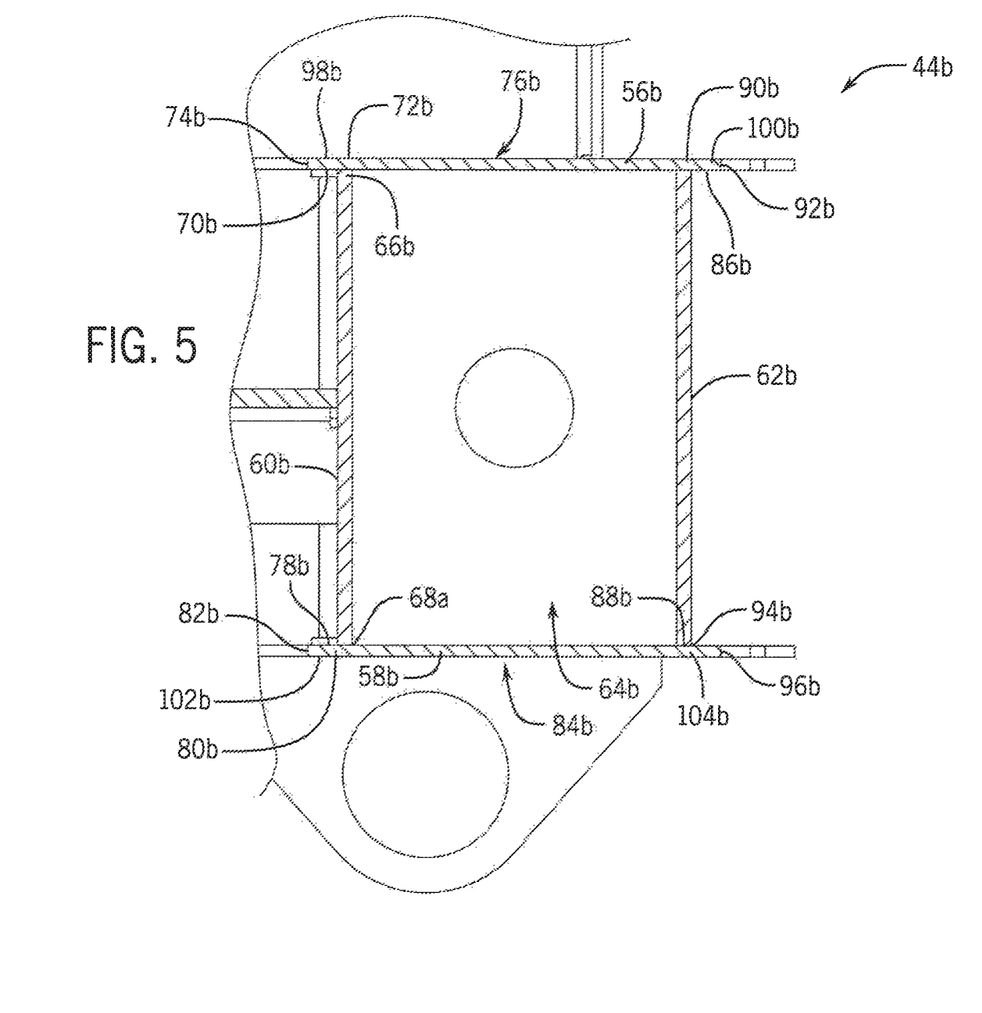
FIG. 5 is a cross-sectional view of a cross-member from a rear portion of the chassis frame of FIG. 3, taken along line 5-5.

Now referring to FIG. 5, a cross-sectional view of a cross-member 44b from the rear portion 14b of the chassis frame 14 of FIG. 3, taken along line 5-5, is shown. Similar to the cross-members 44a, the cross-members 44b include a top plate 56b, a bottom plate 58b, a front side plate 60b, and a rear side plate 62b, which surround a hollow cavity 64b, As with the hollow cavity 64a, the hollow cavity 64b assists in reducing the weight of the chassis frame 14.

As discussed above, the construction of cross-member 44b is similar to the construction of cross-member 44a. The front side plate 60b includes a first end 66b and a second end 68b. The first end 66b of the front side plate 60b is permanently coupled to a bottom surface 70b of the top plate 56b at a first location 72b between a first end 74b and a center point 76b of the top plate 56b. The second end 68b of the front side plate 60b is permanently coupled to a top surface 78b of the bottom plate 58b at a first location 80b between a first end 82b and a center point 84b of the bottom plate 58b. Similarly, the rear side plate 62b includes a first end 86b and a second end 88b. The first end 86b of the rear side plate 62b is permanently coupled to the bottom surface 70b of the top plate 56b at a second location 90b between a second end 92b and the center point 76b of the top plate 56b. The second end 88b of the rear plate 62b is permanently coupled to the top surface 78b of the bottom plate 58b at a second location 94b between a second end 96b and the center point 84b of the bottom plate 58b.

In the representative embodiment of the invention, the top plate 56b includes a portion 100b adjacent the first end 74b of the top plate 56b, which extends beyond the front side plate 60b, and another portion 102b adjacent the second end 92b of the top plate 56b, which extends beyond the rear side plate 62b. Likewise, the bottom plate 58b includes a portion 104b adjacent the first end 82b of the bottom plate 58b, which extends beyond the front side plate 60b, and a portion 106b adjacent the second end 96b of the bottom plate 58b, which extends beyond the rear side plate 62b.

As described above with respect to cross-member 44a, the front and rear side plates 60b, 62b of cross-member 44b extend between the ends 74b, 92b, 82b, 96b of the top and bottom plates 56b, 58b, respectively. In these alternative embodiments of the invention, the top and bottom plates 56b, 58b would not include portions 100b, 102b, 104b, 106b, respectively.

In the representative embodiments of the invention shown in FIGS. 4 and 5, the top plate 56 and the bottom plate 58 are spaced apart from each other and oriented parallel or substantially parallel to each other. In addition, the front and rear side plates 60, 62 extend perpendicularly or substantially perpendicularly between the top and bottom plates 56, 58, as described above.

A thickness of the top plate 56a may differ than the thickness of the top plate 56b, based on the strength needs at the respective portions 14a, 14b of the chassis frame 14. A thickness of the bottom plates 58a, 58b may also differ to provide additional strength in areas of need. In one embodiment of the invention, the thickness of the top and bottom plates 56a, 58a may be greater than the thickness of the top and bottom plates 56b, 58b, in order to provide the additional strength necessary to support the boom 30 and other components at the front portion 14a of the chassis frame 14. In the representative embodiment of the invention, the thickness of the top and bottom plates 56a, 58a may be 0.25 inch (¼ inch), while the thickness of the top and bottom plates 56b, 58b may be 0.1875 inch (³⁄₁₆ inch). However, it is also contemplated that the top and bottom plates 56b, 58b may have greater thicknesses that that of top and bottom plates 56a, 58a in other embodiments of the invention.

In alternative embodiments of the invention, the thickness of the top plates 56a, 56b may be adjusted by the inclusion of additional plates. For instance, the top plates 56a, 56b may each include a number of plates welded together to provide the necessary thicknesses and strength, respectively. As such, the thickness of the top plates 56a, 56b may be adjusted at specific locations requiring extra strength across the chassis frame 14. While, in one instance, the top plate 56a may include a greater number of plates than the top plate 56b to provide a greater thickness and strength, it is also contemplated that the top plate 56b may include a greater number of plates than the top plate 56a, in other embodiments of the invention.

Figure 6:
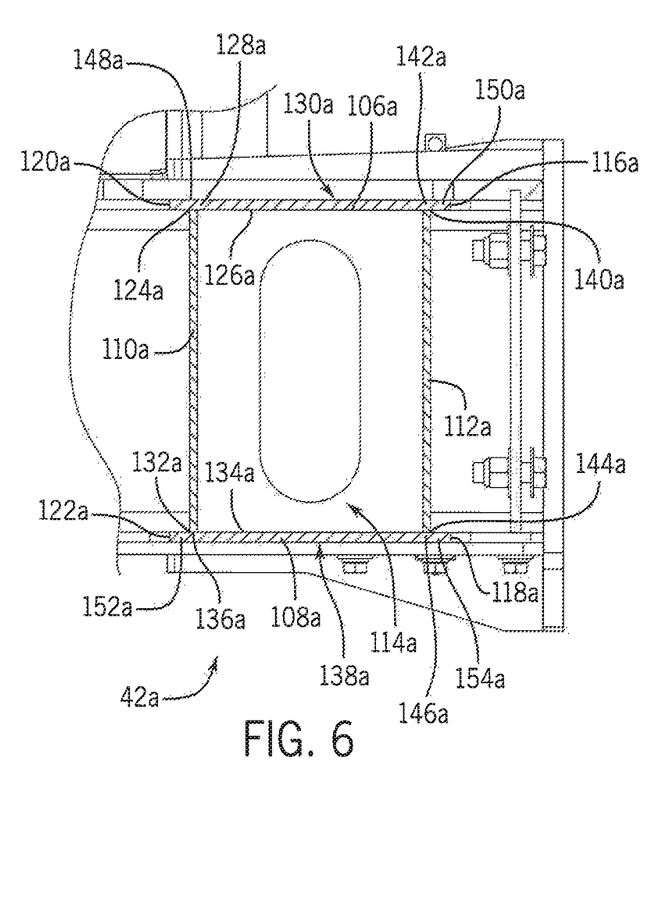
FIG. 6 is a cross-sectional view of a side rail from the front portion of the chassis frame of FIG. 3, taken along line 6-6.

Next, FIG. 6 depicts a cross-sectional view of a side rail 42a from the front portion 14a of the chassis frame 14 of FIG. 3, taken along line 6-6. The cross-sectional view of the side rail 42a is similar in construction to the previously described cross-members 44a, 44b. The side rail 42a includes a top plate 106a spaced apart from and oriented parallel or substantially parallel to a bottom plate 108a, a first, inner side plate 110a extending between and oriented perpendicular or substantially perpendicular to the top and bottom plates 106a, 108a, and a second, outer side plate 112a extending between and oriented perpendicular or substantially perpendicular to the top and bottom plates 106a, 108a. The plates 106a, 108a, 110a, 112a surround a hollow cavity 114a within the side rail 42a, which assists in reducing the weight of the chassis frame 14.

As shown in FIG. 6, the top plate 106a and the bottom plate 108a each include a first end 116a, 118a and a second end 120a, 122a, respectively. The inner side plate 110a includes a first end 124a permanently coupled to a bottom surface 126a of the top plate 106a at a location 128a between the first end 116a and a center point 130a of the top plate 106a. The inner side plate 110a also includes a second end 132a permanently coupled to a top surface 134a of the bottom plate 108a at a location 136a between the first end 118a and a center point 138a of the bottom plate 108a. Similarly, the outer side plate 112a includes a first end 140a permanently coupled to the bottom surface 126a of the top plate 106a at a location 142a between the second end 120a and the center portion 130a of the top plate 106a. The outer side plate 112a also includes a second end 144a permanently coupled to the top surface 1134a of the bottom plate 108a at a location 146a between the second end 122a and the center point 138a of the bottom plate 108a.

In the representative embodiment of the invention, the top plate 106a includes a portion 148a adjacent the first end 116a of the top plate 106a that extends beyond the inner side plate 110a. The top plate 106a include another portion 150a adjacent the second end 120a of the top plate 108a that extends beyond the outer side plate 112a. Likewise, the bottom plate 108a includes a portion 152a adjacent the first end 118a of the bottom plate 108a, which extends beyond the inner side plate 110a, and a portion 154a adjacent the second end 122a of the bottom plate 108a, which extends beyond the outer side plate 112a.

In other embodiments of the invention, the inner and outer side plates 110a, 112a may extend between the top and bottom plates 106a, 108a at their respective ends 116a, 120a, 118a, 122a. In such an embodiment of the invention, the top and bottom plates 106a, 108a would not include portions 148a, 150a, 152a, 154a, respectively.

Figure 7:
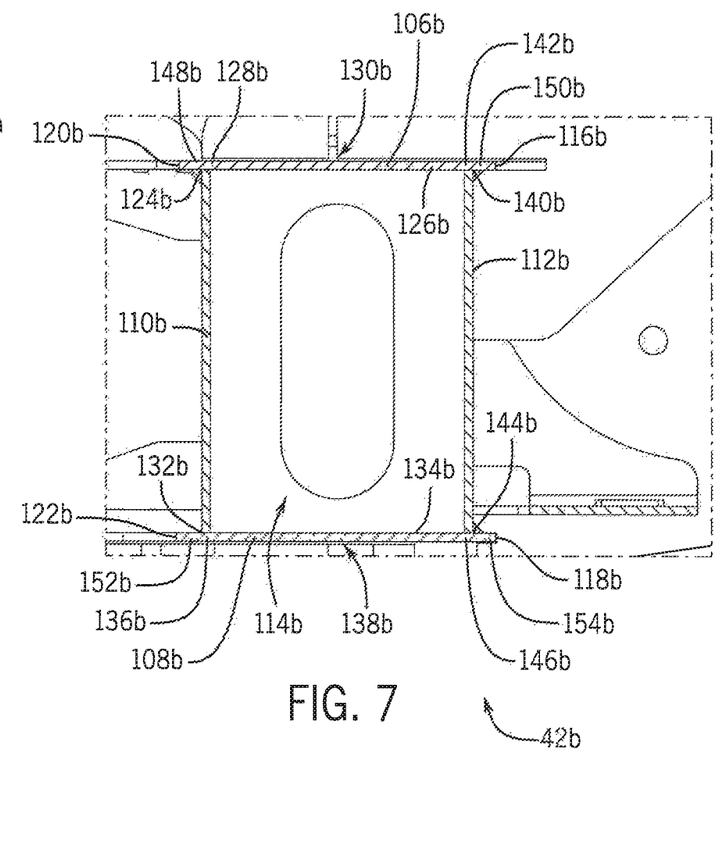
FIG. 7 is a cross-sectional view of a side rail from the rear portion of the chassis frame of FIG. 3, taken along line 7-7.

Now referring to FIG. 7, a cross-sectional view of a side rail 44b from the rear portion 14b of the chassis frame 14 is shown, taken along line 7-7 of FIG. 3. The construction of side rail 44b is similar to the construction of side rail 44a, described above with respect to FIG. 6. The side rail 42b includes a top plate 106b spaced apart from and oriented parallel or substantially parallel to a bottom plate 108b, an inner side plate 110b that extends between and is oriented perpendicular or substantially perpendicular to the top and bottom plates 106b, 108b, and an outer side plate 112b that extends between and is oriented perpendicular or substantially perpendicular to the top and bottom plates 106b, 108b. The plates 106b, 108b, 110b, 112b surround a hollow cavity 114b within the side rail 42b. The hollow cavity 114b assists in reducing the weight of the chassis frame 14.

In the representative embodiment of the invention, the inner side plate 110b includes a first end 124b permanently coupled to a bottom surface 126b of the top plate 106b at a location 128b between a first end 116b and a center point 130b of the top plate 106b. The inner side plate 110b further includes a second end 132b permanently coupled to a top surface 134b of the bottom plate 108b at a location 136b between a first end 118b and a center point 138b of the bottom plate 108b. Meanwhile, the outer side plate 112b includes a first end 140b permanently coupled to the bottom surface 126b of the top plate 106b at a location 142b between a second end 120b and the center portion 130b of the top plate 106b. The outer side plate 112b further includes a second end 144b permanently coupled to the top surface 134b of the bottom plate 108b at a location 146b between a second end 122b and the center point 138b of the bottom plate 108b.

FIG. 7 further illustrates the top plate 106b including a portion 148b adjacent the first end 116b of the top plate 106b, which extends beyond the inner side plate 110b, and another portion 150b adjacent the second end 120b of the top plate 106b, which extends beyond the outer side plate 112b. Similarly, the bottom plate 108b includes a portion 152b adjacent the first end 118b of the bottom plate 108b, which extends beyond the inner side plate 110b, and another portion 154b adjacent the second end 122b of the bottom plate 108b, which extends beyond the outer side plate 112b.

In alternative embodiments of the invention, the inner and outer side plates 110b, 112b may extend between the top and bottom plates 106b, 108b from their ends 116b, 120b, 118b, 122b, respectively. In these embodiment of the invention, the top and bottom plates 106b, 108b would not include respective portions 148b, 150b, 152b, 154b.

A thickness of the top plate 106a may differ than the thickness of the top plate 106b, based on the strength needs at the respective portions 14a, 14b of the chassis frame 14. In addition, a thickness of the bottom plates 108a, 108b may differ to provide even more strength in areas of need. In one embodiment of the invention, the thickness of the top and bottom plates 106a, 108a may be greater than the thickness of the top and bottom plates 106b, 108b, in order to provide the additional strength necessary to support the boom 30 and other components at the front portion 14a of the chassis frame 14. In the representative embodiment of the invention, the thickness of the top and bottom plates 106a, 108a may be 0.25 inch (¼ inch), while the thickness of the top and bottom plates 106b, 108b may be 0.1875 inch (³⁄₁₆ inch). However, it is also contemplated that the top and bottom plates 106b, 108b may have greater thicknesses than that of top and bottom plates 106a, 108a in other embodiments of the invention. That is, different configurations of components of the sprayer 10 on the chassis frame 14 may result in different strength needs of the chassis frame 14.

In yet other embodiments of the invention, the thickness of the top plates 106a, 106b may be adjusted by adjusting the number of plates welded together to create the top plate 106a, 106b. For example, the top plates 106a, 106b may each include a number of plates welded together to provide the necessary thickness and strength, respectively. As such, the thickness of the top plates 106a, 106b may be adjusted at specific locations that require extra strength across the chassis frame 14. In one instance, the top plate 106a may include a greater number of plates than the top plate 106b to provide a greater thickness and strength, while, in other instances, the top plate 106b may include a greater number of plates than the top plate 106a, in other embodiments of the invention.

We refer again to FIGS. 2 and 3, which illustrates perspective and top views of the chassis frame 14. As previously described, the chassis frame 14 includes a front portion 14a, also referred to as the main support section 14a, and a rear portion, also referred to as the engine support section 14b. The chassis frame 14 include a plurality of mounting tabs 156 extending from an edge of either the top plate 36, the bottom plate 38, or both. Each mounting tab 156 is integrally formed with its respective top plate 36 or bottom plate 38 from which it extends. In addition, each mounting tab 156 includes at least one orifice 158 formed therethrough in order to facilitate mounting of components of the sprayer 10 to the chassis frame 14. The chassis frame 14 also includes a plurality of mounting brackets 162 welded to surfaces of the chassis frame 14. Each mounting bracket 162 includes at least one orifice 166 for mounting components of the sprayer 10 to the chassis frame 14.

Referring first to the main support section 14a of the chassis frame 14, a number of the mounting tabs 156 extend from the top and bottom plates 36a, 38a along the perimeter 52 of at least one of the central openings 48. While the representative embodiment of the invention illustrates mounting tabs extending from both the top and bottom plates 36a, 38a, it is also contemplated that the mounting tabs may extend from only the top plates 36a, only the bottom plates 38a, or both, in varying embodiments of the invention.

As shown in FIG. 2, the mounting tabs 156 extending from the top plate 56a of the cross-members 44a may extend from both the first end 74a and the second end 92a of the top plate 56a. In other embodiments of the invention, the mounting tabs 156 may extend from either the first end 74a, the second end 92a, or both. Similarly, the mounting tabs 156 extending from the bottom plate 58a of the cross-members 44a may extend from both the first end 82a and the second end 96a of the bottom plate 58a. It is also contemplated that the mounting tabs 156 may extend from only the first end 74a, only the second end 92a, or both ends 74a, 92a, in different embodiments of the invention.

The mounting tabs 156 may also extend from the bottom plate 108a of the side rails 42a. In other embodiments of the invention, the mounting tabs 156 may extend from the top plate 106a alone, the bottom plate 108a alone, or both the top plate and bottom plates 106a, 108a. FIGS. 2 and 3 further illustrate the mounting tabs 156 extending from the bottom plate 108a of the side rails 42a as extending from the outer edge 118a of the bottom plate 108a, In other words, the mounting tabs 156 extending from the bottom plate 108a of the side rails 42a are extending from an outer edge 160 of the chassis frame 14. However, it is also contemplated that the mounting tabs 156 may extend from either edge 118a, 122a of the bottom plate 108a and either edge 116a, 120a of the top plate 106a.

In addition, a number of mounting brackets 162 may be welded to the main support section 14a of the chassis frame 14. As shown in FIGS. 2 and 3, some of the mounting brackets 162 within the main support section 14a of the chassis frame 14 may be permanently coupled to the top plate 36b. For example, mounting brackets 162 may be welded to a top surface 164a of the top plate 56a of one of the cross-members 44a or a top surface 168 of the top plate 106a of one of the side rails 42a.

Additionally, some mounting brackets 162 within the main support section 14a of the chassis frame 14 may be permanently coupled to one of the side plates 60a, 62a of one of the cross-members 44a. It is also contemplated that mounting brackets 162 may be permanently coupled to one of the side plates 110a, 112a of one of the side rails 42a. For instance, FIG. 2 illustrates a mounting bracket 162 welded to side plates 62a of the cross-member 44a. However, in other embodiments of the invention, the mounting bracket 162 may be welded to either side plate 60a, 62a of the cross-member 44a. The mounting bracket 162 is oriented perpendicular to the respective side plate 62a and cantilevers from the side plate 62a. In alternative embodiments of the invention, the mounting brackets 162 may be coupled to any of the plates 56a, 58a, 60a, 62a, 106a, 108a, 110a, 112a, alone or in combination with each other.

Referring now to the engine support section 14b of the chassis frame 14, a number of mounting tabs 156 also extend from the both top and bottom plates 36b, 38b along the perimeter 52 of at least one of the central openings 48. In other embodiments of the invention, mounting tabs 156 may extend from both the top and bottom plates 36b, 38b, the top plates 36b only, or the bottom plates 38b only.

As shown in FIG. 2, the mounting tabs 156 within the engine support section 14b of the chassis frame 14 extend from the side rails 42b of the chassis frame 14. In alternative embodiments of the invention, mounting tabs 156 may also extend from the cross-members 44b within the engine support section 14b of the chassis frame 14. FIGS. 2 and 3 further illustrate the mounting tabs 156 extending from the bottom plate 108n of the side rails 42n as extending from the inner edge 122b of the bottom plate 108b and the inner edge 120b of the top plate 106b. In other words, the mounting tabs 156 extending from the top and bottom plate 108n of the side rails 42b are extending from the perimeter 52 of the central opening 48. In other embodiments of the invention, it is also contemplated that the mounting tabs 156 may extend from either edge 118a, 122a of the bottom plate 108a and either edge 116a, 120a of the top plate 106a.

A number of mounting brackets 162 may also be welded to the engine support section 14b of the chassis frame 14. As depicted in the figures, some of the mounting brackets 162 within the main support section 14a of the chassis frame 14 may be permanently coupled to the top plate 36b. For instance, mounting brackets 162 may be welded to a top surface 168b of the top plate 106b of one of the side rails 44b. In other embodiments of the invention, mounting brackets 162 may also be welded to a top surface 164b of the top plate 56b of one of the cross-members 44b.

Some mounting brackets 162 within the engine support section 14b of the chassis frame 14 may also be permanently coupled to one of the side plates 110b, 112b of one of the side rails 42b. In addition, mounting brackets 162 may also be coupled to one of the side plates 60b, 62b of one of the cross-members 44b. As exemplified in FIG. 2, a mounting bracket 162 may be welded to side plates 110b, 62b of one of the side rails 42b or cross-members 44b, respectively. The mounting bracket 162 is oriented perpendicular to the respective side plate 110b, 62b and cantilevers from the side plate 110b, 62b. In alternative embodiments of the invention, the mounting brackets 162 may be coupled to any of the plates 56b, 58b, 60b, 62b, 106b, 108b, 110b, 112b, alone or in combination with each other.

Figure 8:
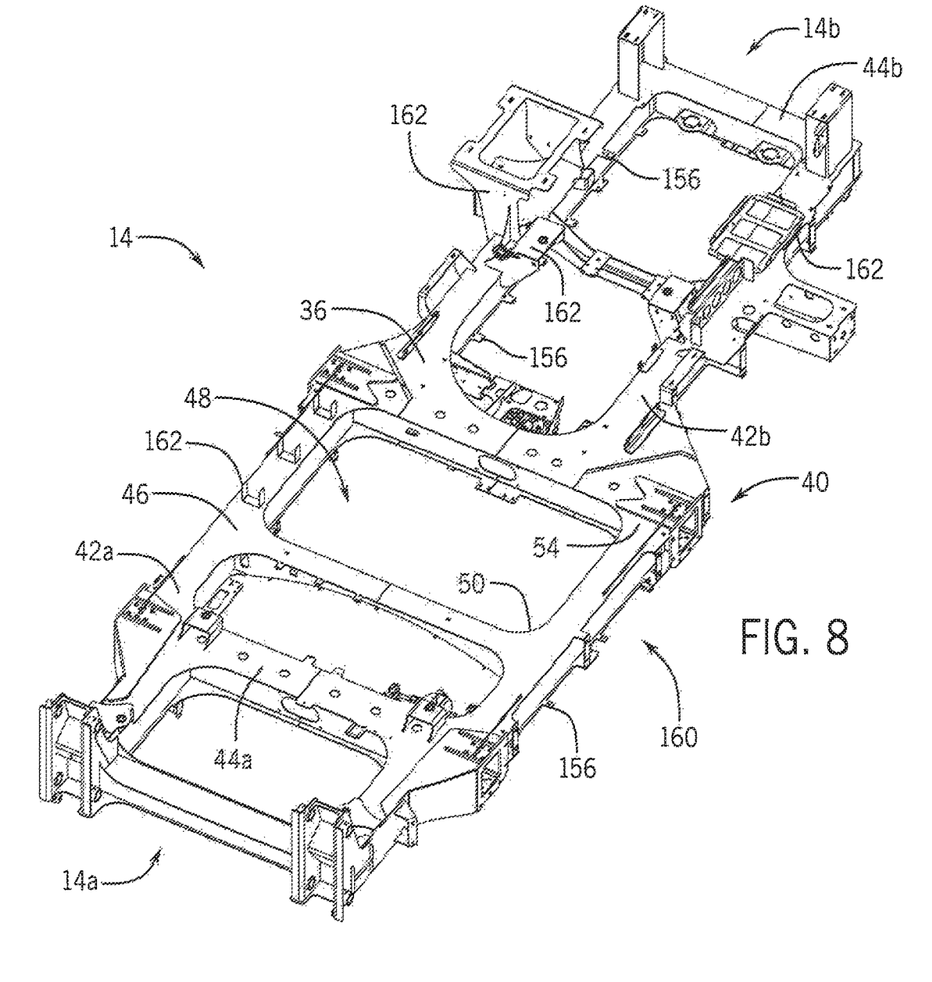
FIG. 8 is another perspective view of the chassis frame of FIG. 2.

Next, FIG. 8 depicts another perspective view of the chassis frame 14 to further illustrate the mounting tabs 156 extending from the top and bottom plates 36, 38 of the chassis frame 14 and the mounting brackets 162 welded to the chassis frame 14. In particular, FIG. 8 provides an alternative angle of the chassis frame 14 to further depict the mounting tabs 156 and mounting brackets 162 described above, with respect to FIGS. 2 and 3.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A chassis frame comprising:
   a top plate lying in a first horizontal plane;
   a bottom plate lying in a second horizontal plane and spaced apart from the top plate;
   a plurality of side plates extending from the top plate to the bottom plate, the top plate, the bottom plate and the plurality of side plates defining an enclosed frame portion;
   a first plurality of mounting tabs integral with and extending from the top plate in the first horizontal plane, the first plurality of mounting tabs extending laterally from the enclosed frame portion;
   a second plurality of mounting tabs integral with and extending from the bottom plate in the second horizontal plane, the second plurality of mounting tabs extending laterally from the enclosed frame portion; and
   a plurality of mounting brackets permanently coupled to at least one of the top plate and the plurality of side plates.

2. The chassis frame of claim 1 wherein the first plurality of mounting tabs extends from at least one edge of the top plate.

3. The chassis frame of claim 1 wherein the second plurality of mounting tabs extends from at least one edge of the bottom plate.

4. The chassis frame of claim 1 wherein the plurality of mounting brackets is permanently coupled to at least one of a side surface and a top surface of the top plate.

5. The chassis frame of claim 1 wherein at least one of the plurality of mounting brackets is permanently coupled to at least one of the plurality of side plates.

6. The chassis frame of claim 5 wherein at least one of the plurality of mounting brackets is permanently coupled to at least one of the plurality of side plates and is cantilevered from its respective side plate.

7. The chassis frame of claim 1 wherein each of the plurality of mounting tabs includes at least one orifice formed therethrough.

8. The chassis frame of claim 1 further comprising a plurality of central openings, each central opening having a perimeter formed from edges of the top and bottom plates of the chassis frame;
   wherein each of the plurality of mounting tabs extends from the perimeter of the central opening.

9. A method of manufacturing a chassis frame comprising: providing a top plate having a plurality of mounting tabs projecting from at least one edge of the top plate, the top plate lying in a first horizontal plane; providing a bottom plate spaced apart from the top plate having a plurality of mounting tabs projecting from at least one edge of the bottom plate, the bottom plate lying in a second horizontal plane; coupling a plurality of side plates to the top plate and to the bottom plate, each side plate extending between the top plate and the bottom plate, wherein: the top plate, the bottom plate and the plurality of side plates define an enclosed frame portion; and the plurality of mounting tabs of the top plate and the plurality of mounting tabs of the bottom plate extend laterally from the enclosed frame portion; and coupling a plurality of mounting brackets to at least one of the top plate and the plurality of side plates.

10. The method of claim 9 wherein coupling a plurality of mounting brackets comprises permanently coupling at least one of the plurality of mounting brackets to at least one a side surface and a top surface of the top plate.

11. The method of claim 9 wherein coupling a plurality of mounting brackets comprises permanently coupling at least one of the plurality of mounting brackets to at least one of the plurality of side plates.

12. Me method of claim 11 coupling at least one of the plurality of brackets to at least one of the plurality of sides plates comprises cantilevering the mounting bracket from its respective side plate.

13. The method of claim 9 further comprising the steps of:
   forming at least one orifice extending through each of the plurality of mounting tabs of the top plate; and
   forming at least one orifice extending through each of the plurality of mounting tabs of the bottom plate.

14. A chassis frame comprising:
   a main support section comprising:
      a top plate lying in a first horizontal plane;
      a bottom plate lying in a second horizontal plane and spaced apart from the top plate;
      a plurality of side plates extending from the top plate to the bottom plate, the top plate, the bottom plate and the plurality of side plates defining a first enclosed frame portion;
      a first plurality of mounting tabs integral with and extending from the top plate in the first horizontal plane, the first plurality of mounting tabs extending laterally from the first enclosed frame portion;
      a second plurality of mounting tabs integral with and extending from the bottom plate in the second horizontal plane, the second plurality of mounting tabs extending laterally from the first enclosed frame portion; and
      a plurality of mounting brackets permanently coupled to at least one of the top plate and the plurality of side plates;
   an engine support section comprising:
      a top plate lying in a third horizontal plane;
      a bottom plate lying in a second horizontal plane and spaced apart from the top plate of the engine support section;
      a plurality of side plates extending from the top plate of the engine support section to the bottom plate of the engine support section, the top plate, the bottom plate and the plurality of side plates of the engine support section defining a second enclosed frame portion;
      a third plurality of mounting tabs integral with and extending from the top plate of the engine support section in the third horizontal plane, the third plurality of mounting tabs extending laterally from the second enclosed frame portion;
      a fourth plurality of mounting tabs integral with and extending from the bottom plate of the engine support section in the fourth horizontal plane, the fourth plurality of mounting tabs extending laterally from the second enclosed frame portion; and a plurality of mounting brackets permanently coupled to at least one of the top plate and the plurality of side plates of the engine support section.

15. The chassis frame of claim 14 wherein the main support section and the engine support section are defined by a plurality of side rails and a plurality of cross-members intersecting at a plurality of intersection points;

wherein at least one central opening is disposed between the intersecting side rails and cross-members, each central opening having a perimeter defined by the adjacent intersecting side rails and cross-members;

wherein at least one mounting tab of the first and second plurality of mounting tabs within the main support section of the chassis frame extends from at least one cross-member along the perimeter of at least one central opening; and wherein at least one mounting tab of the third and fourth plurality of mounting tabs within the engine support section of the chassis frame extends from at least one side rail along the perimeter of at least one central opening.

16. The chassis frame of claim 14 wherein the main support section and the engine support section are defined by a plurality of side rails and a plurality of cross-members intersecting at a plurality of intersection points; and wherein at least one mounting tab of the first and second plurality of mounting tabs within the main support section of the chassis frame extends from at least one side rail along an outer edge of the chassis frame.

17. The chassis frame of claim 14 wherein at least one of the plurality of mounting brackets is permanently coupled a top surface the top plate.

18. The chassis frame of claim 14 wherein at least one of the plurality of mounting brackets is permanently coupled to at least one of the plurality of side plates and is cantilevered from its respective side plate.

19. The chassis frame of claim 14 wherein the main support section and the engine support section are defined by a plurality of side rails and a plurality of cross-members intersecting at a plurality of intersection points; and wherein the plurality of mounting brackets within the main support section are coupled to at least one of a top plate of one of the side rails, a top plate of one of the cross-members, and a side plate of one of the cross-members.

20. The chassis frame of claim 14 wherein the main support section and the engine support section are defined by a plurality of side rails and a plurality of cross-members intersecting at a plurality of intersection points; and wherein the plurality of mounting brackets within the engine support section are coupled to a top plate of plurality of side rails, a side plate of the plurality of side rails, and a side plate of one of the cross-members.

\* \* \* \* \*